(No Model.)
J. A. SPENCER.
BALING PRESS.
No. 526,060.  Patented Sept. 18, 1894.
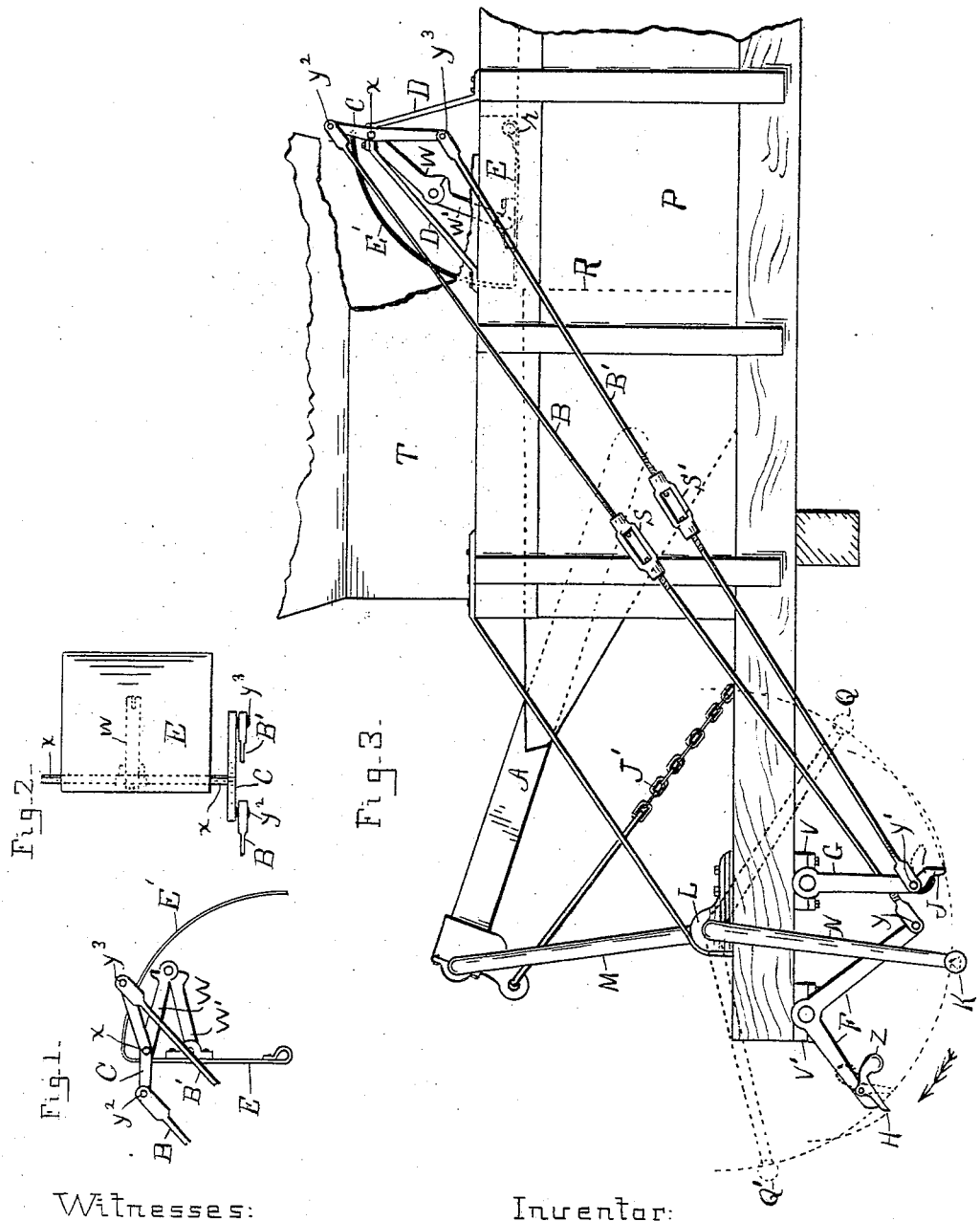
Witnesses:
Ray Hutchins
Herbert Cowell
Inventor:
Julius A. Spencer
By Thos. H. Hutchins, Attorney

UNITED STATES PATENT OFFICE.

JULIUS A. SPENCER, OF DWIGHT, ILLINOIS.

BALING-PRESS.

SPECIFICATION forming part of Letters Patent No. 526,060, dated September 18, 1894.

Application filed May 19, 1894. Serial No. 511,749. (No model.)

*To all whom it may concern:*

Be it known that I, JULIUS A. SPENCER, a citizen of the United States of America, residing at Dwight, in the county of Livingston and State of Illinois, have invented certain new and useful Improvements in Baling-Presses, of which the following is a specification, reference being had therein to the accompanying drawings and the letters of reference thereon, forming a part of this specification, in which—

Figure 1 is an end view of the door for preventing material from bulging up in front of the follower before it reaches the bale chamber, and showing it as detached from the machine, and showing the parts for operating it and immediately connected with it. Fig. 2 is a plan view of Fig. 1. Fig. 3 is a side elevation of a portion of a baling press, showing the door for preventing material from bulging up in front of the follower and also showing the devices for operating said door.

This invention relates to certain improvements in procumbent baling presses, which improvements relate more particularly to the mechanism for preventing material from bulging up in front of the follower before it reaches the bale chamber, which improvements are fully set forth and explained in the following specification and claims.

Referring to the drawings P represents the side of the bale chamber of an ordinary baling press for baling fibrous material, said bale chamber being provided with an ordinary follower R connected to the drive crank M by means of a pitman A.

E represents a door pivotally connected at *r* to the machine so as to be in line with the ceiling of the bale chamber, and extending toward the follower, and forming, when in the position shown in Fig. 3 an extension of the ceiling of the bale chamber toward the follower. Said door has secured to its forward free edge an upwardly extending curved shield E', curved toward the bale chamber, on an arc of a circle from the center *r*.

X is a rock shaft extending across the top of the machine, and having its ends journaled in boxes in standard brackets D, D, secured to the top of the machine. A toggle connects said door E with the rock shaft X, the arm W of said toggle being secured to said shaft, and the arm W' of said toggle being pivotally attached to said door E on its upper side, so that when said toggle is folded, it will carry said door to the position shown in Fig. 1.

C is a crank secured to one end of the rock shaft X, the longer arm of which is connected with arm G through the medium of rod B' having a turn-buckle S' between its ends for adjusting the length of said rod, said arm G having its inner end journaled in box V, and its outer end pivotally connected to said rod B' at *y'*. The outer shorter arm of said crank C is connected with one arm of bell crank F through the medium of rod B having a turn buckle S between its ends for adjusting its length. Said bell crank F is journaled at its angle in a box V', and the outer end of its long arm is pivotally connected to said rod B at *y*.

The outer ends of the arms of bell crank F and arm G are each provided with gravity dogs H and J respectively pivotally connected thereto, and weighted as shown at *z* so as to hold them in their proper position to be engaged by the wrist pin K of crank N, and return them to their first position after being tripped by crank N on its return.

The crank N oscillates between the points Q and Q', and is represented in Fig. 3 as moving in the direction of the arrow after having engaged dog J and carried it and the arm G to which it is attached to the position shown in said figure, and having become released from said dog by reason of it having moved out of the path of said crank, which movement of said dog and its arm has through the medium of rod B' closed the door E as shown in said figure. Further movement of crank N in the direction of the arrow will cause its crank pin K to engage dog H, at about the time the follower has reached the bale chamber, and carry said dog and the bell crank F with it until said dog and crank become disengaged from each other by reason of said dog moving out of the path of said crank pin, which movement of said dog and its bell crank through the medium of rod B opens the door E to the position shown in Fig. 1.

When the crank N returns its pin K will trip said gravity dogs and permit said crank to return to its first position at Q ready to move backward and perform another like operation, so that the oscillation of said crank automatically opens and closes said door for the purpose hereinafter set forth.

T is the feed hopper in which the fibrous material to be baled is placed at any time after the follower R has reached the outer end of the door E. Material can begin to be put in the hopper as soon as the follower reaches said door, and the curved shield E' attached to said door will prevent material from falling on said door at such time.

The door E, it will be observed, does not close the entire feed aperture, and for that reason material can be fed in the machine continuously, even when said door is closed, its curved shield E' preventing material from falling on the door.

J' shows a section of a chain and rod attached to the crank end of the pitman A, and leading to some adjacent power not necessary to be shown, for moving the follower forward, and mechanism not necessary to be shown will return the follower from the bale chamber.

In operation the fibrous material is placed in the hopper T on the top of the follower as soon as it reaches said door. When the follower returns from the bale chamber, said fibrous material is forced down into the press in front of the follower, and as the follower begins to move toward the bale chamber the door E is closed down as before stated and carries any material against or under it down in front of the follower. As the follower is moved toward the bale chamber by means of crank M and pitman A, it will move under door E pressing the material forward to and in the bale chamber, said door preventing the material from bulging up before it reaches the bale chamber. At the time the follower has about reached the point at which said door is pivoted, crank N has engaged dog H as before stated and opens said door to the position shown in Fig. 1 where it will remain until the machine is again fed as stated and another like operation is performed.

Having thus described my invention, what I claim as new, and desire to secure by Letters Patent, is as follows:

1. In a baling press the combination of the bale chamber, the follower, the door hinged at the bale end of the feed hopper on a plane with the ceiling of the bale chamber and arranged to close only a portion of the feed aperture, and having the curved shield E', and means for automatically opening and closing said door substantially as and for the purpose set forth.

2. In a baling machine the combination of the bale chamber P, the reciprocating follower R its pitman A and crank M, door E forming an extension of the ceiling of the bale chamber at its plunger end, and having the curved shield E', rock shaft X, toggle W W' for connecting said door and shaft, crank arm C secured on the said shaft, rods B and B', bell crank F having dog H, arm G having dog J and crank N all arranged to operate substantially as and for the purpose set forth.

3. In a baling press the combination of the bale chamber P and follower R, door E forming an extension of the ceiling of the bale chamber at its plunger end and arranged to close only a portion of the feed aperture, and having the curved shield E' and adapted to open toward the bale chamber, and the means for automatically opening and closing said door substantially as and for the purpose set forth.

4. In a bale press the combination of the bale chamber, the follower, and the door hinged at the bale end of the feed aperture on a plane with the ceiling of the bale chamber and having the curved shield, and arranged to close only a portion of said feed aperture, and means for automatically opening and closing said door for the purpose set forth.

JULIUS A. SPENCER.

Witnesses:
THOS. H. HUTCHINS,
HERBERT COWELL.